(12) United States Patent
Dominguez et al.

(10) Patent No.: US 10,676,397 B2
(45) Date of Patent: Jun. 9, 2020

(54) SOIL REMEDIATION BY MOLECULAR BINDING FOR PRODUCING BENEFICIAL USE DETERMINED POLYMER CONCRETE PRODUCTS

(71) Applicants: Glenn Joseph Dominguez, Setauket, NY (US); Peter Pirozzi, Belle Terre, NY (US)

(72) Inventors: Glenn Joseph Dominguez, Setauket, NY (US); Peter Pirozzi, Belle Terre, NY (US)

(*) Notice: Subject to any disclaimer, the term of this patent is extended or adjusted under 35 U.S.C. 154(b) by 612 days.

(21) Appl. No.: 15/389,418

(22) Filed: Dec. 22, 2016

(65) Prior Publication Data

US 2017/0174568 A1 Jun. 22, 2017

Related U.S. Application Data

(60) Provisional application No. 62/270,699, filed on Dec. 22, 2015.

(51) Int. Cl.
| | |
|---|---|
| *B09C 1/08* | (2006.01) |
| *C04B 26/02* | (2006.01) |
| *C04B 14/36* | (2006.01) |
| *B29B 7/88* | (2006.01) |
| *B29C 39/00* | (2006.01) |
| *B29C 35/02* | (2006.01) |
| *B29K 509/06* | (2006.01) |

(52) U.S. Cl.
CPC .............. *C04B 26/02* (2013.01); *B09C 1/08* (2013.01); *B29B 7/88* (2013.01); *B29C 35/02* (2013.01); *B29C 39/003* (2013.01); *C04B 14/361* (2013.01); *B29K 2509/06* (2013.01)

(58) Field of Classification Search
None
See application file for complete search history.

(56) References Cited

U.S. PATENT DOCUMENTS

2006/0074141 A1* 4/2006 Hayner ................. G21F 1/10
523/136
2009/0069462 A1* 3/2009 Binh ....................... C04B 28/04
524/8

* cited by examiner

*Primary Examiner* — Monica A Huson
*Assistant Examiner* — Kelsey C Grace

(57) ABSTRACT

A method for soil remediation by molecular binding for producing beneficial use determined polymer concrete product that removes hazardous pollutants from a quantity of contaminated soil. Hazardous pollutants are identified though chemical analysis in order to select at least corresponding polymer and at least one corresponding binder for each hazardous pollutant present in the contaminated soil. The at least one polymer chemically bonds with the hazardous pollutant in order to neutralize the hazardous pollutant within the contaminated soil to form a polymer concrete product. The polymer concrete product is then used as a concrete substitute for construction applications.

7 Claims, 4 Drawing Sheets

SOIL REMEDIATION BY MOLECULAR BINDING FOR PRODUCING BENEFICIAL USE DETERMINED POLYMER CONCRETE PRODUCTS

The current application claims a priority to the U.S. Provisional Patent application Ser. No. 62/270,699 filed on Dec. 22, 2015.

FIELD OF THE INVENTION

The present invention relates generally to a process for cleaning and recovering contaminated ground soil sites, Brown-Fields, through the complete extraction and remediation of the contaminated soil from said site. More particularly, it is the objective of the present invention to introduce a cost-effective process for cleaning and revitalizing Brown-Fields by completely removing and utilizing contaminated upland soil and/or contaminated sediments as aggregate, while molecularly binding contaminants into a new, superior, "Beneficial Use Determined" polymer concrete product, rendering the original contaminants harmless.

BACKGROUND OF THE INVENTION

There is an ever-increasing need to address and restore contaminated soils in Brown-Fields around the world. A "Brown-Field" site is land that was once used for industrial purposes or for commercial uses and is now contaminated with unacceptable concentrations of hazardous waste.

Soil contamination or soil pollution is caused by the presence of human-made chemicals or other alterations in the natural soil environment. The soil contamination is typically caused by industrial activity, agricultural chemicals, or improper disposal of waste. The most common chemicals involved are petroleum hydrocarbons, poly-nuclear aromatic hydrocarbons, solvents, pesticides, lead, and other heavy metals. The soil contamination is correlated with the degree of industrialization and intensity of chemical usage.

The concern over soil contamination stems primarily from health risks, from direct contact with the contaminated soil, from vapors from the contaminants, and from secondary contamination of water supplies within and underlying the soil. Mapping of contaminated soil sites and the resulting cleanup are time consuming and expensive tasks, requiring extensive amounts of geology, hydrology, chemistry, computer modeling skills, and geographic information systems (GIS) in Environmental Contamination, as well as an appreciation of the history of industrial chemistry.

Current methods for soil remediation are chemical specific, while others apply to a broad range of pollutants. Techniques for soil remediation fall into the following general categories; biological, chemical, and physical treatments such as extraction, immobilization, and thermal methods. These current methods are expensive and cost prohibitive and result in the fact that many of these contaminated lands or Brown-Fields have been abandoned. Current methods are not only cost prohibitive, but can also be time consuming and ineffective, meaning they fail to completely remediate the property. It is therefore the objective of the present invention to introduce a new cost-effective process for the total remediation of contaminated sites or Brown-Fields in the most economical and quickest possible manner.

The present invention incorporates the physical process of the excavation of the soil, with a chemical process, which chemically binds, immobilizes and utilizes the contaminants rendering them harmless. Additionally, the chemical process, while causing molecular change, produces thermal benefits as well. The present invention can be performed either onsite (preferred) or offsite to the Brown-Field site. The present invention completely removes the contaminates from the site whether completing the process on or off site. By excavating the contaminated soil, the present invention provides one of the fastest and most timely remediation processes. Upon curing of the new polymer concrete product, the remediation process is complete. Both the Brown-Field and the new polymer concrete products are clean and harmless.

DETAIL DESCRIPTIONS OF THE INVENTION

All illustrations of the drawings are for the purpose of describing selected versions of the present invention and are not intended to limit the scope of the present invention.

The present invention is soil remediation by molecular binding for producing beneficial use determined polymer concrete products. Through implementation of the present invention, lands with concentrations of hazardous pollutants can be remediated in order to reduce the concentration of hazardous pollutants to an acceptable level or eliminate the concentration of hazardous pollutants completely. The result of the present invention is a polymer concrete product, which may or may not be considered a beneficial use determined (BUD) product, from a quantity of contaminated soil. A BUD product is a preferred building product originating from solid waste that ceases to be solid waste after undergoing a remediation process. In order to execute the present invention, a quantity of contaminated soil, a quantity of polymers, a quantity of binders, a quantity of aggregates, and a quantity of resins are necessary (Step A). The contaminated soil is soil that contains hazardous pollutants, which include, but are not limited to, petroleum hydrocarbons, poly-nuclear aromatic hydrocarbons, solvents, pesticides, lead, arsenic, and other heavy metals that pose a health and environmental risk. The quantity of polymers binds to the hazardous pollutants in order to make the hazardous pollutants inert. The quantity of binders assists with bonding the polymers with the hazardous pollutants. The quantity of aggregates and the quantity of resin allow the present invention to shape a polymer concrete product, molecularly binding and rendering the hazardous pollutants harmless within the polymer concrete product.

Figure 1:
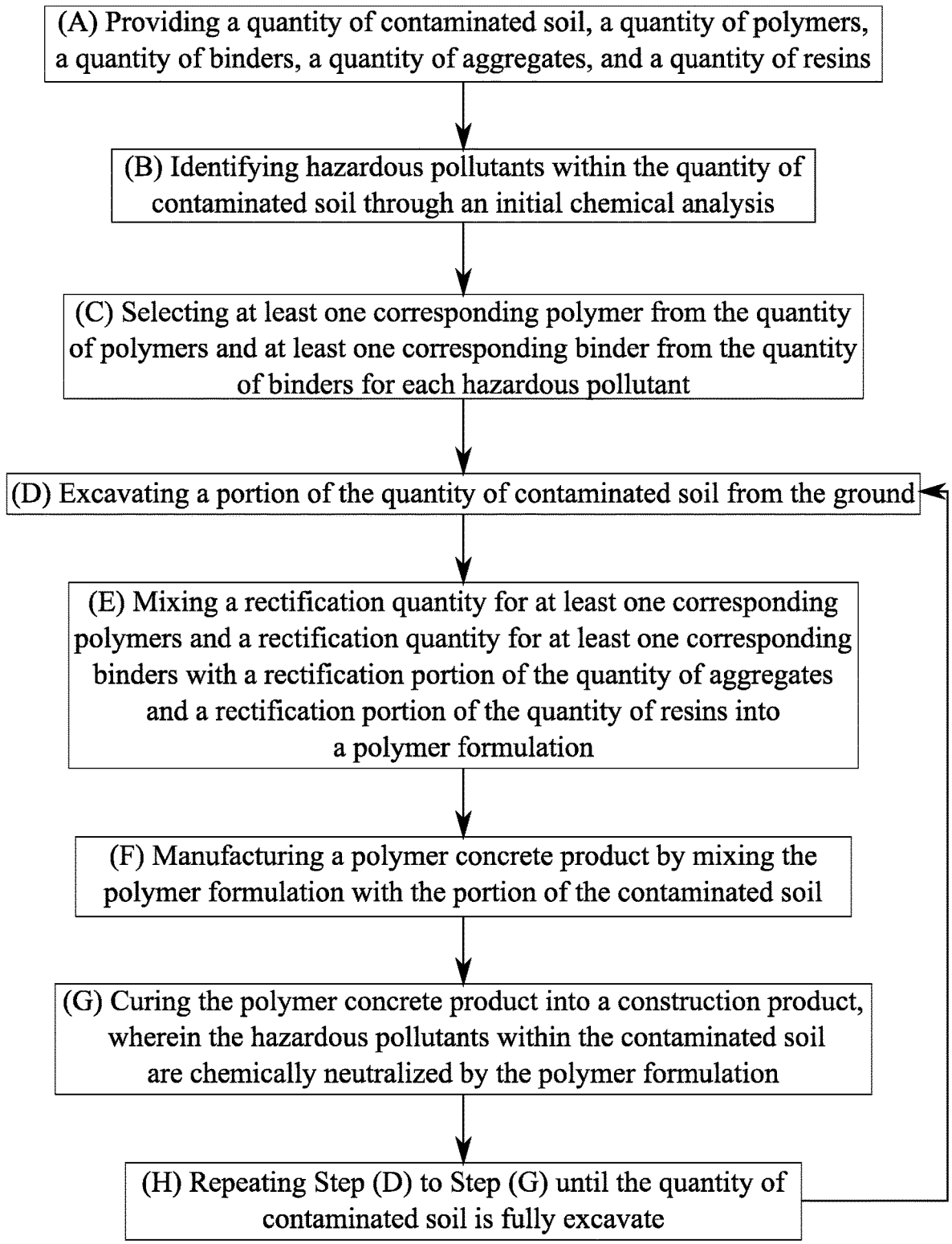
FIG. 1 is a flowchart showing the overall process of the present invention.

In accordance to FIG. 1, initially the hazardous pollutants are identified within the quantity of contaminated soil through an initial chemical analysis that determines the compounds present within the contaminated soil (Step B). Chemical analysis methods include, but are not limited to, chromatography, spectroscopy, or any other methods capable of differentiating molecular structures. Once the chemical composition of the quantity of contaminated soil is determined, at least one corresponding polymer from the quantity of polymers and at least one corresponding binder from the plurality of binders are selected for each hazardous pollutant (Step C). The at least one corresponding polymer and the at least one corresponding binder are selected to be resistant to the hazardous pollutant and to have near zero-porosity when cured. Therefore, the at least one corresponding polymer and the at least one binder are able to undergo a chemical reaction with the hazardous pollutants to render the hazardous pollutants inert.

Figure 2:
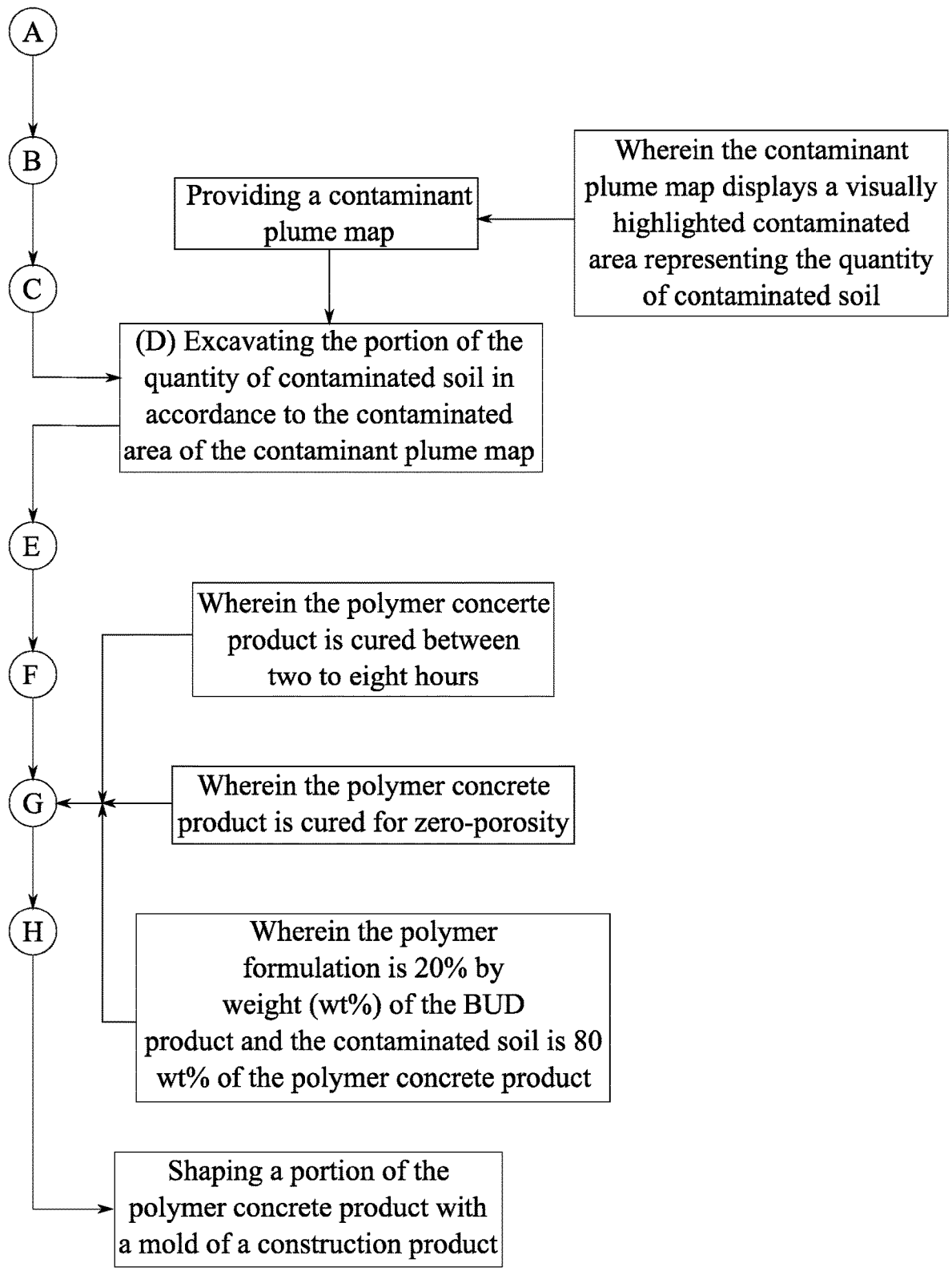
FIG. 2 is a flowchart showing the shaping and curing of the construction product.

Simultaneous to the chemical analysis of Step B, a portion of the quantity of contaminated soil is excavated from the ground (Step D), in order to effectively mix the contaminated soil with the quantity of polymers and the quantity of binders to render the hazardous pollutants inert and harmless. More specifically, the portion of the quantity of contaminated soil is excavated in accordance to a contaminant plume map, as shown in FIG. 2. The contaminant plume map is a geographical map which displays the visually highlighted contaminated area representing the quantity of contaminated soil. The contaminant plume map allows for more precise excavating of the quantity of contaminated soil by designating where the quantity of contaminated soil is located and preventing the unnecessary removal of uncontaminated soil.

Subsequent to the chemical analysis of Step B, a rectification quantity for at least one corresponding polymers and a rectification quantity for at least one corresponding binders are mixed with a rectification portion of the quantity of aggregates and a rectification portion of the quantity of resins into a polymer formulation (Step E). The rectification quantity for at least one corresponding polymers and the rectification quantity for at least one corresponding binders are greater than or equivalent to the molar quantity of the hazardous pollutants in order to neutralize the hazardous pollutants. The rectification portion of the quantity of aggregates and the rectification portion of the quantity of resins are selected for the consistency and physical properties of the polymer concrete product.

Once Step D and Step E are complete, the polymer concrete product is manufactured by mixing the polymer formulation with the portion of the contaminated soil (Step F). The hazardous pollutants are then chemically neutralized by the polymer formulation as a reaction takes place between the hazardous pollutants and the polymer formation. The contaminated soil and the polymer formation are preferably mixed to be approximately 80% by weight (wt %) and approximately 20 wt % of the polymer concrete product, respectively. This composition is preferred as the approximate 80-20 wt % ratio allows for sufficient structural stability to a construction application using the polymer concrete product, as well as, for neutralizing the hazardous pollutants. The polymer concrete product is then cured into a construction product (Step G) in order to completely neutralize and render the hazardous pollutants to be harmless. The construction product is a prefabricated material implemented in the construction application. Step D to Step G are then repeated until the quantity of contaminated soil is fully excavated (Step H). Therefore, removing the hazardous pollutants completely from the quantity of contaminated soil and the contaminated soil from the lands with concentrations of hazardous pollutants.

Further in accordance to the preferred embodiment of the present invention, the polymer concrete product is able to be formed for construction applications from a reference list of applications for the polymer concrete product including, but not limited to, highways, streets, parking lots, parking garages, bridges, high-rise buildings, dams, homes, floors, sidewalks, seawalls and driveways. For some applications, the polymer concrete product is shaped with a mold of a construction product, as shown in FIG. 2. The portion of the polymer concrete product is then cured into the construction product, such that the construction product benefits from the material properties of the polymer concrete product. The polymer concrete product is preferably cured between two and eight hours in order for the polymer formulation to harden into the form of the construction product. Additionally, the polymer concrete product when cured molecularly binds the hazardous pollutants in a new near zero-porosity polymer concrete product, in order to prevent the hazardous pollutants from leeching out of the construction product in use for construction applications.

Figure 4:
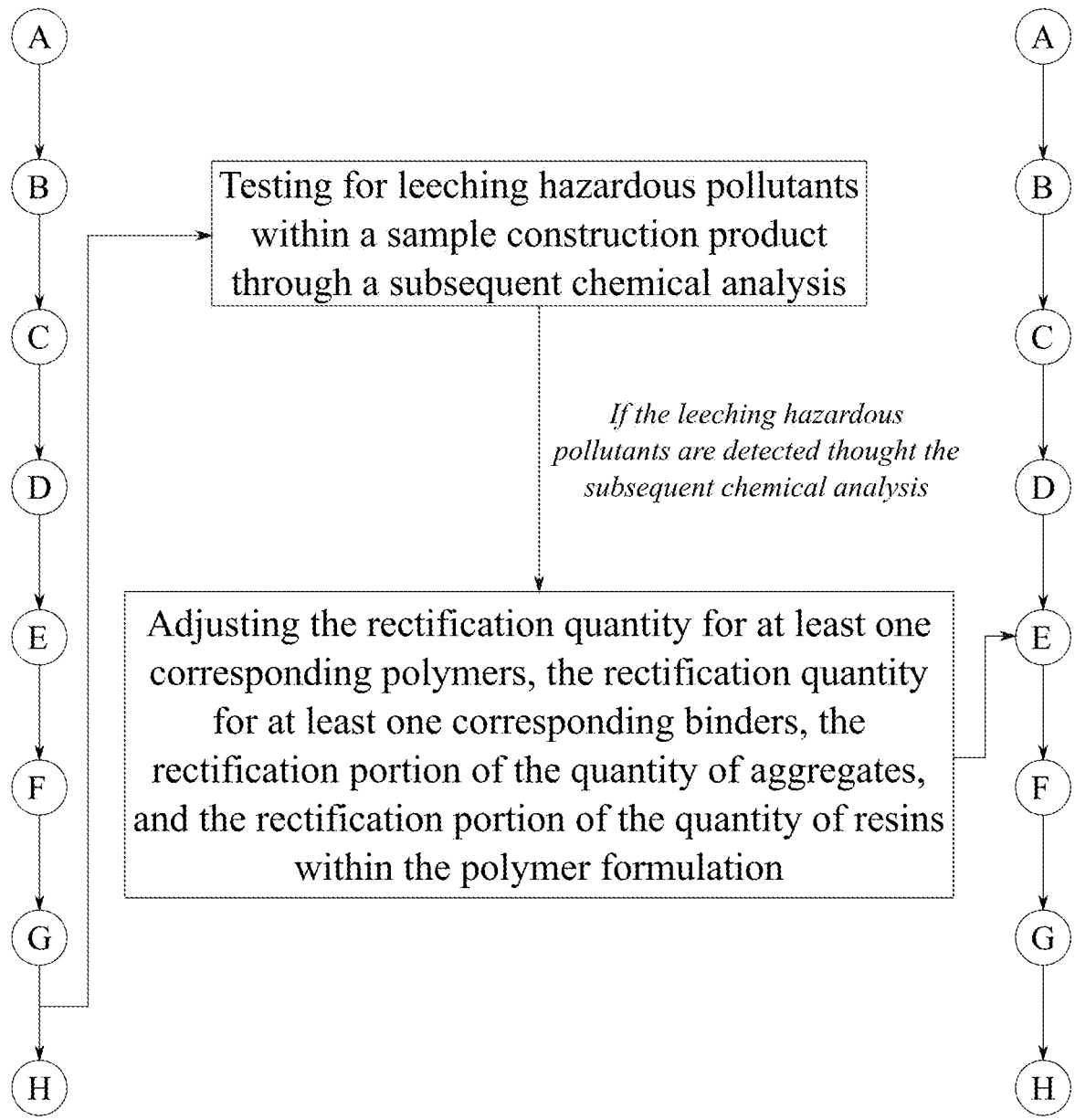
FIG. 4 is a flowchart showing the quality control of the construction product.

After the construction product is cured, the presence of leeching hazardous pollutants within a sample construction product is tested through a subsequent chemical analysis before Step H, as shown in FIG. 4. The subsequent chemical analysis determines if there is any leeching of the hazardous pollutant from the sample construction product in order to ensure the quality of future construction products. If leeching hazardous pollutants are detected though the subsequent chemical analysis, the rectification quantity for at least one corresponding polymers, the rectification quantity for at least one corresponding binders, the rectification portion of the quantity of aggregates, and the rectification portion of the quantity of resins is adjusted within the polymer formulation for subsequent repetitions of Step E to Step G, in order to render the hazardous pollutants harmless.

Figure 3:
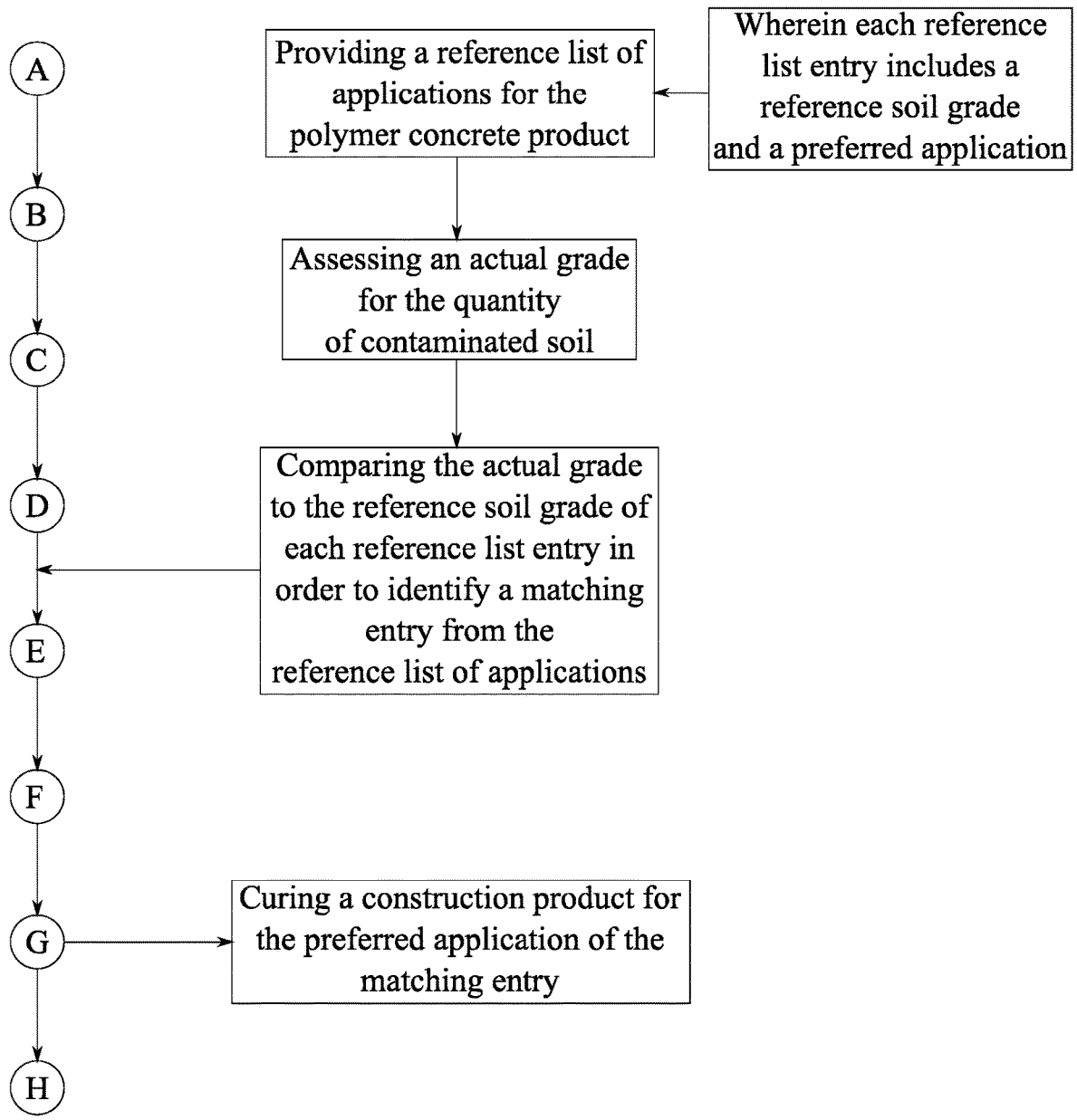
FIG. 3 is a flowchart showing the construction production selection process.

In some embodiments of the present invention, each reference list entry of the reference list of applications include a reference soil grade and a preferred application, in accordance to FIG. 3. The reference soil grade is the desired particle size to effectively be utilized for the preferred application of construction applications. An actual grade for the quantity of contaminated soil is assessed prior to Step F, wherein the actual grade is the size and consistency for particles for the quantity of contaminated soil. The actual grade is then compared to the reference soil grade for each reference list entry in order to identify a matching entry from the reference list of applications. Therefore, possible construction applications are found which are appropriate for the quantity of contaminated soil. The construction product is then cured for the preferred application of the matching entry during to Step G.

Construction products manufactured using the polymer concrete product benefit from: being impervious to liquids, due to low or near zero-porosity; exhibiting favorable thermal properties, such as frost resistance as the construction product does not absorb water; providing electrical insulation; being resistant to corrosive substances, including acids and bases; being resistant to scratching and superficial damage; being resistant to erosion; having a higher compressive strength than traditional concrete; having a high strength to weight ratio, allowing easier installation of the construction products; providing good adhesion to essential construction materials (steel & standard concrete); vibrational dampening properties, due to the quantity of resin; having a smooth surface; being resistant to ultraviolet radiation, preventing color from fading from the construction product; resistant to expansion and contraction due to changes in weather and atmospheric factors; and being easily drilled or cut using diamond bits and blades, if modifications need to be made to the construction product.

Although the invention has been explained in relation to its preferred embodiment, it is to be understood that many other possible modifications and variations can be made without departing from the spirit and scope of the invention as hereinafter claimed.

What is claimed is:

1. A method for soil remediation by molecular binding for producing beneficial use determined polymer concrete products comprises the steps of:
   (A) providing a quantity of contaminated soil, a quantity of polymers, a quantity of binders, a quantity of aggregates, and a quantity of resins;
   (B) identifying hazardous pollutants within the quantity of contaminated soil through an initial chemical analysis;
   (C) selecting at least one corresponding polymer from the quantity of polymers and at least one corresponding binder from the quantity of binders for each hazardous pollutant;
   (D) excavating a portion of the quantity of contaminated soil from the ground;
   providing a reference list of applications for a polymer concrete product, wherein each reference list entry includes a reference soil grade and a preferred application;
   assessing an actual grade for the quantity of contaminated soil;
   comparing the actual grade to the reference soil grade of each reference list entry in order to identify a matching entry from the reference list of applications;
   (E) mixing a rectification quantity for at least one corresponding polymers and a rectification quantity for at least one corresponding binders with a rectification portion of the quantity of aggregates and a rectification portion of the quantity of resins into a polymer formulation;
   (F) manufacturing the polymer concrete product by mixing the polymer formulation with the portion of the contaminated soil;
   (G) curing the polymer concrete product into a construction product and curing the construction product for the preferred application of the matching entry, wherein the hazardous pollutants within the contaminated soil are chemically neutralized by the polymer formulation; and
   (H) repeating Step (D) to Step (G) until the quantity of contaminated soil is fully excavated.

2. The method for soil remediation by molecular binding for producing beneficial use determined polymer concrete products, as claimed in claim 1, comprises the step of:
   shaping the polymer concrete product with a mold of a construction product.

3. The method for soil remediation by molecular binding for producing beneficial use determined polymer concrete products, as claimed in claim 1, comprises the step of:
   testing for leeching hazardous pollutants within a sample construction product through a subsequent chemical analysis prior to Step (H); and
   adjusting the rectification quantity for at least one corresponding polymers, the rectification quantity for at least one corresponding binders, the rectification portion of the quantity of aggregates, and the rectification portion of the quantity of resins within the polymer formulation for subsequent repetitions of Step (E) to Step (G),
   if the leeching hazardous pollutants are detected thought the subsequent chemical analysis.

4. The method for soil remediation by molecular binding for producing beneficial use determined polymer concrete products, as claimed in claim 1, wherein the polymer concrete product is cured between two to eight hours.

5. The method for soil remediation by molecular binding for producing beneficial use determined polymer concrete products, as claimed in claim 1, wherein the polymer concrete product is cured for near zero-porosity.

6. The method for soil remediation by molecular binding for producing beneficial use determined polymer concrete products, as claimed in claim 1, wherein the polymer formulation is approximately 20% by weight (wt %) of the polymer concrete product and the contaminated soil is approximately 80 wt % of the polymer concrete product.

7. The method for soil remediation by molecular binding for producing beneficial use determined polymer concrete products, as claimed in claim 1, comprises the steps of:
   providing a contaminant plume map, wherein the contaminant plume map displays a visually highlighted contaminated area representing the quantity of contaminated soil; and
   excavating the quantity of contaminated soil in accordance to the visually highlighted contaminated area of the contaminant plume map.

* * * * *